(12) United States Patent
Raimondi

(10) Patent No.: US 6,216,572 B1
(45) Date of Patent: Apr. 17, 2001

(54) MACHINE TOOL FOR MACHINING SHEET METAL

(75) Inventor: Federico Raimondi, Bologna (IT)

(73) Assignee: Rainer S.r.l., Calderara di Reno (IT)

( * ) Notice: Subject to any disclaimer, the term of this patent is extended or adjusted under 35 U.S.C. 154(b) by 0 days.

(21) Appl. No.: 08/964,895

(22) Filed: Nov. 5, 1997

(30) Foreign Application Priority Data

Nov. 6, 1996 (IT) ............................................. BO96A0559

(51) Int. Cl.$^7$ ................................ B26D 3/00; B26D 7/00
(52) U.S. Cl. ........................ 83/86; 83/94; 83/96; 83/153; 83/167; 83/277; 83/916
(58) Field of Search .................................. 83/86, 94, 96, 83/151, 153, 160, 167, 206, 250, 277, 282, 916

(56) References Cited

U.S. PATENT DOCUMENTS

| | | | |
|---|---|---|---|
| 3,452,628 | * | 7/1969 | Pfaffle ................................ 83/167 X |
| 3,518,908 | * | 7/1970 | Daniels .................................. 83/151 |
| 3,691,887 | * | 9/1972 | Roch ................................. 83/277 X |
| 3,830,121 | * | 8/1974 | Makeev et al. ...................... 83/94 X |
| 4,040,318 | * | 8/1977 | Makeev et al. .................... 83/277 X |
| 4,466,318 | * | 8/1984 | Schoch ............................... 83/277 X |
| 4,519,284 | * | 5/1985 | Hunter et al. ....................... 83/277 X |
| 4,709,605 | | 12/1987 | Clark . |
| 4,846,033 | * | 7/1989 | Uehlinger et al. .................... 83/94 X |
| 5,036,736 | * | 8/1991 | Hillock et al. ........................ 83/94 X |
| 5,120,178 | | 6/1992 | Ito . |
| 5,249,492 | * | 10/1993 | Brown et al. ......................... 83/94 X |
| 5,347,898 | * | 9/1994 | Ito ...................................... 83/151 X |

FOREIGN PATENT DOCUMENTS

| | | | | |
|---|---|---|---|---|
| 886943 | * | 11/1971 | (CA) ...................................... 83/167 |
| 3826530 | * | 5/1990 | (DE) ...................................... 83/916 |
| 590044 | * | 1/1978 | (RU) ...................................... 83/167 |
| 1423227 | * | 9/1988 | (RU) ...................................... 83/160 |

* cited by examiner

*Primary Examiner*—M. Rachuba
(74) *Attorney, Agent, or Firm*—Shlesinger, Arkwright & Garvey LLP

(57) ABSTRACT

A machine for punching sheet metal, and having a worktable beneath which are located two stores for storing blank and machined sheets. Over each store, the worktable has a respective opening, which is closed selectively by a respective movable closing device, which, in the closed position, defines a portion of the worktable. Over one of the two stores, a handling device is provided for partly lifting a blank sheet from the store and over the worktable; and, over the other of the two stores, a movable stop element is provided for retaining the machined sheet over the respective opening as the respective movable closing device is moved.

21 Claims, 4 Drawing Sheets

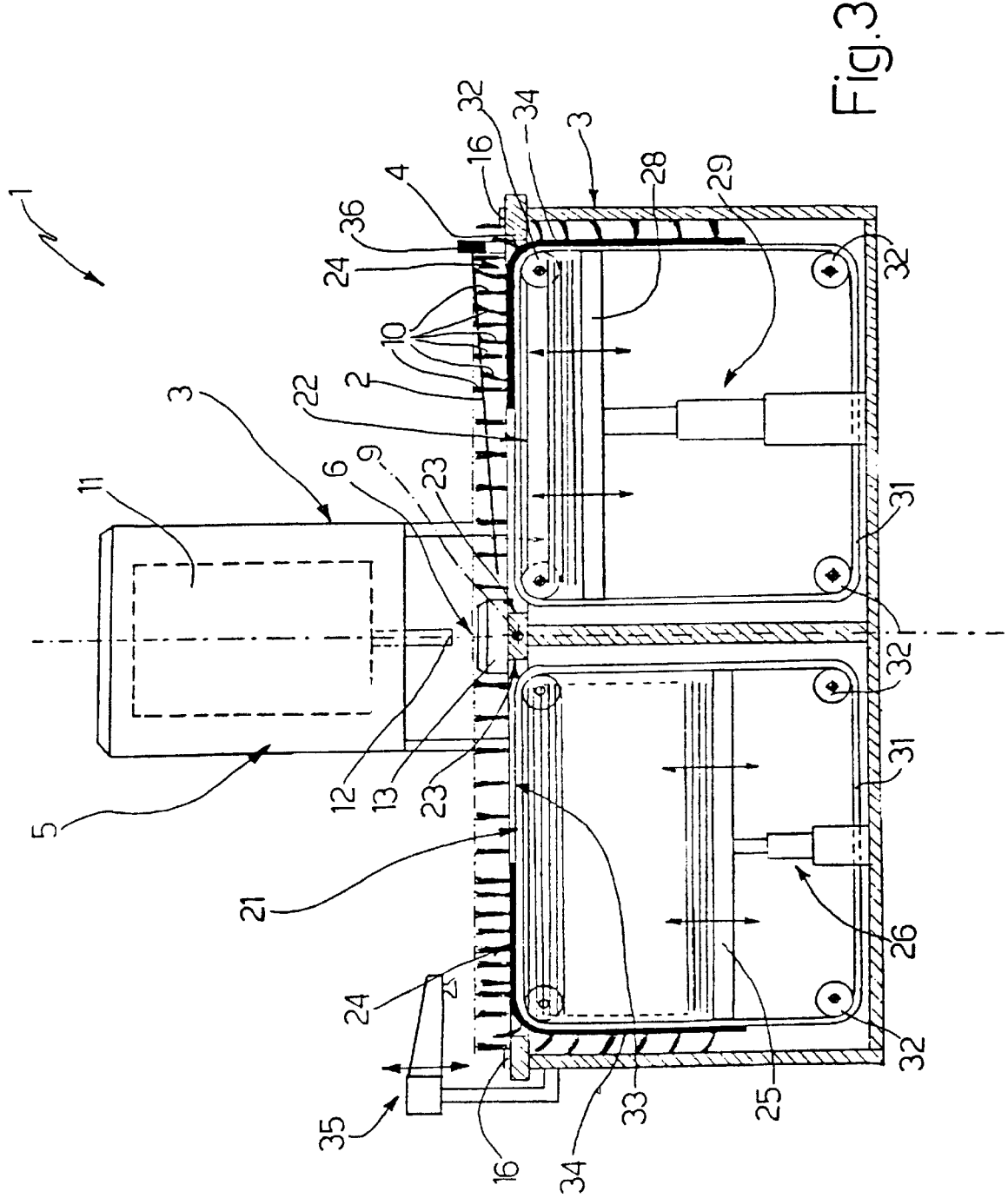

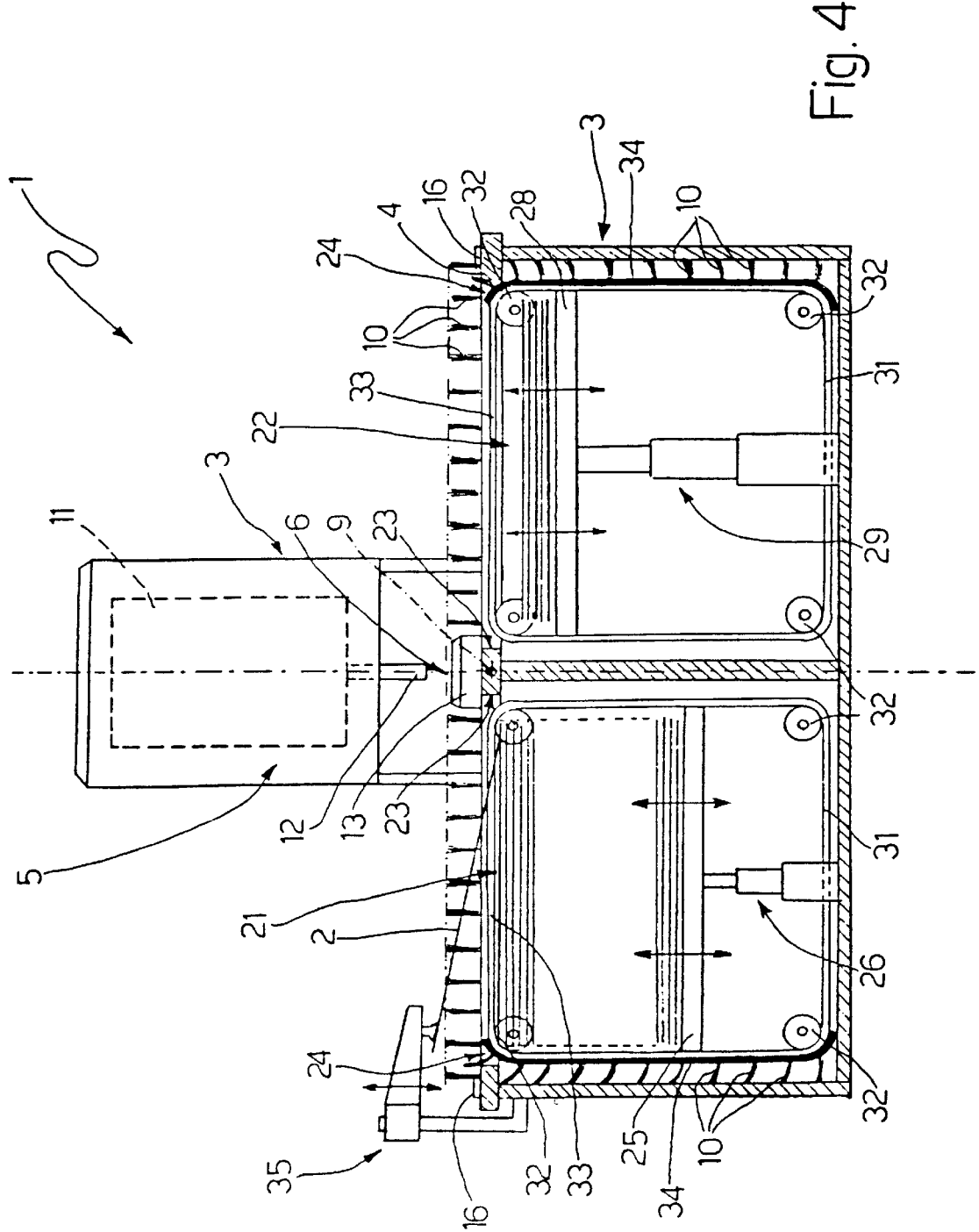

MACHINE TOOL FOR MACHINING SHEET METAL

BACKGROUND OF THE INVENTION

The present invention relates to a machine tool for machining sheet metal.

Known machine tools for machining sheet metal comprise a worktable; a punch unit located on the worktable at a work station; a first and second store on either side of the worktable; a first handling device for transferring the sheets from the first store onto the worktable; and a second handling device for transferring the sheets from the worktable to the second store.

Such machines also comprise a positioning device for positioning the sheet at the work station; and a control unit for controlling the handling devices, the positioning device and the punch unit to automatically machine the sheets. More specifically, the positioning device is movable over the worktable to receive a sheet from the first handling device, position at least a portion of the sheet at the work station, and, finally, transfer the sheet to the second handling device.

The main drawback of machines of the above type is their size, which is out of all proportion to the size of the sheets that can be machined.

SUMMARY OF THE INVENTION

It is therefore an object of the present invention to provide a machine tool of compact design.

According to the present invention, there is provided a machine tool for machining sheet metal, and comprising a worktable; a punch unit located on said worktable at a work station; a sheet feeding and positioning device for feeding and positioning at least one sheet at said work station; and a control unit for controlling said punch unit and said sheet feeding and positioning device; said punch unit comprising a ram located over the worktable at said work station; at least one punch located between said worktable and said ram at the work station; and a counterpunch located on the worktable at said work station and aligned with said punch; said sheet feeding and positioning device positioning at least a portion of said sheet on the worktable, between said punch and said counterpunch; and said machine tool being characterized by comprising two stores located beneath the worktable; each of said stores being located beneath a respective opening formed in said worktable; and said opening comprising movable closing means for selectively enabling the corresponding store to communicate with the top of said worktable.

BRIEF DESCRIPTION OF THE DRAWINGS

A non-limiting embodiment of the present invention will be described by way of example with reference to the accompanying drawings, in which:

FIG. 3 shows a side view, with parts in section and parts removed for clarity, of the FIG. 1 machine tool at a second operating stage;

FIG. 4 shows a side view, with parts in section and parts removed for clarity, of the FIG. 1 machine tool at a third operating stage.

DETAILED DESCRIPTION OF THE INVENTION

Figure 1:
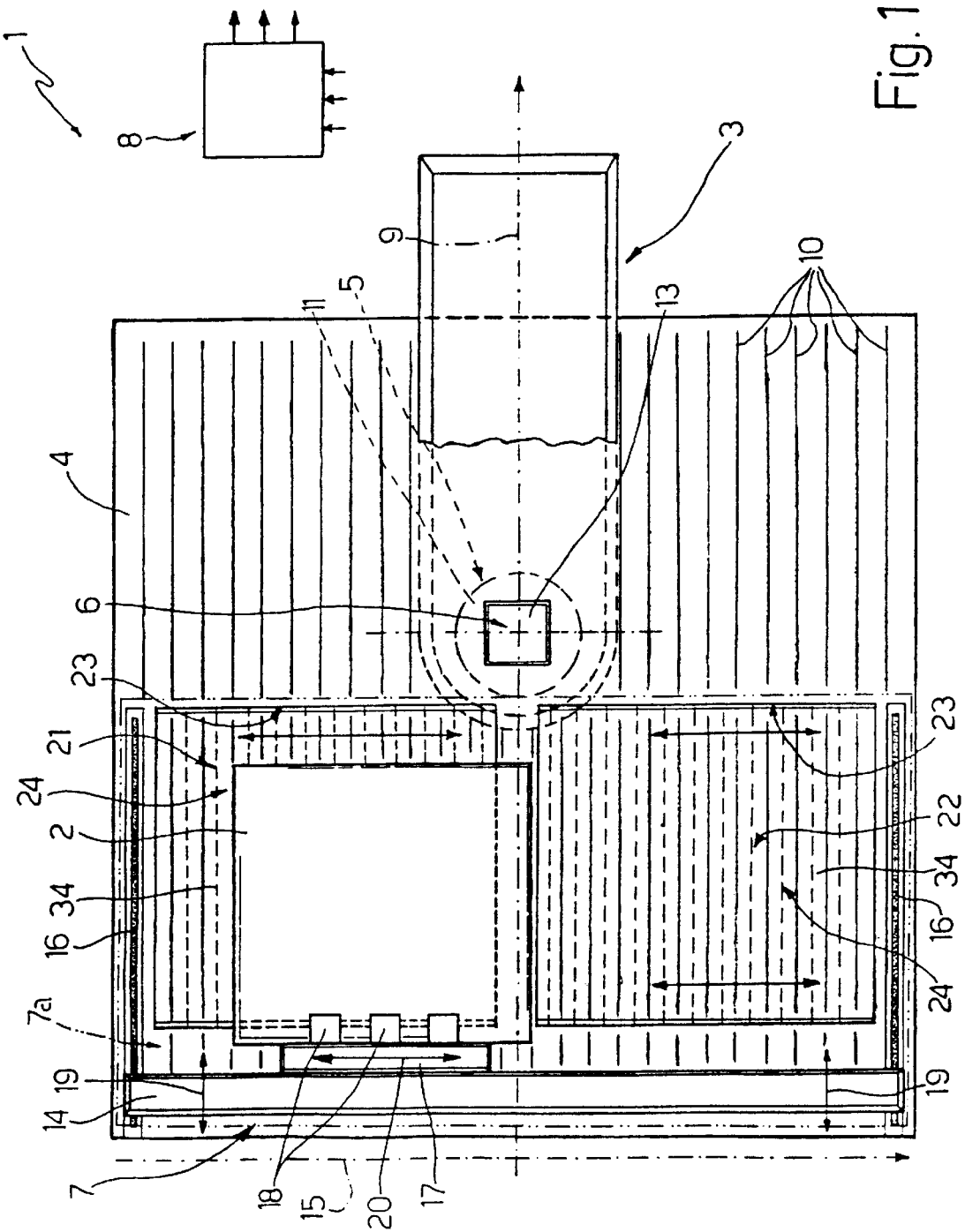
FIG. 1 shows a plan view, with parts removed for clarity, of a machine tool in accordance with the teachings of the present invention.

Number 1 in FIG. 1 indicates as a whole a machine tool for punching a metal sheet 2.

Machine 1 comprises a frame 3; a horizontal worktable 4; a known punch unit 5 located on the worktable at a work station 6; a feeding and positioning device 7 for feeding and positioning sheet 2 at work station 6; and a control unit 8 in turn comprising an electronic central unit for controlling feeding and positioning device 7 and punch unit 5.

Worktable 4 is defined by a horizontal plate, which extends coaxially with a horizontal axis 9, is supported by frame 3, and comprises on top a number of rows of parallel, horizontal brushes 10.

Punch unit 5 is supported by frame 3, and comprises a ram 11 over worktable 4 at work station 6, a punch 12 located between worktable 4 and ram 11 at work station 6, and a counterpunch (or "die") 13 located on worktable 4 at work station 6 and aligned with ram 11 and punch 12.

Feeding and positioning device 7 is movable over worktable 4 within a work area 7a, and provides for positioning any portion of sheet 2 between punch 12 and counterpunch 13.

More specifically, feeding and positioning device 7 comprises a carriage 14, which extends over worktable 4 in a direction parallel to a horizontal axis 15 perpendicular to axis 9, and runs along guides 16 extending parallel to axis 9 along a portion of worktable 4; a gripping device 17, which runs along carriage 14 and comprises a number of grippers 18 for gripping sheet 2; and two drive units (not shown) controlled by control unit 8, and a first of which moves carriage 14 in a direction 19 parallel to axis 9, and a second of which moves gripping device 17 in a direction 20 parallel to axis 15.

Figure 2:
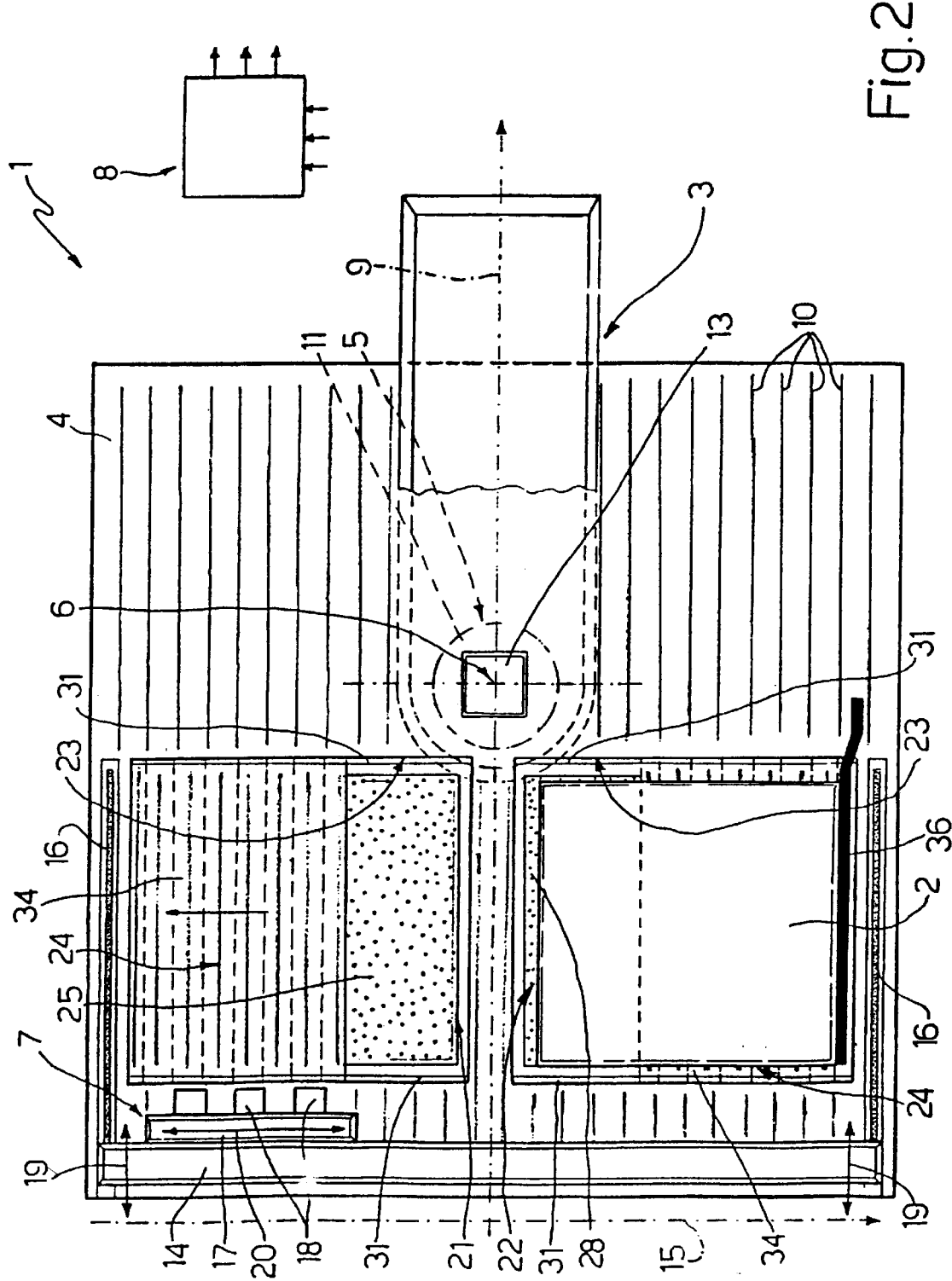
FIG. 2 shows a plan view, with parts removed for clarity, of the FIG. 1 machine tool at a first operating stage.

With reference to FIGS. 2, 3 and 4, machine 1 also comprises two stores 21 and 22 located beneath worktable 4 and each aligned with a respective opening 23 formed in worktable 4. The two openings 23 are formed in worktable 4 within work area 7a and on either side of axis 9, and each comprises a respective movable closing device 24 for selectively closing opening 23.

Store 21 comprises a horizontal loading platform 25 for supporting a stack of blank sheets 2; and a lift device 26 controlled by control unit 8 and for vertically lifting loading platform 25 so that the top of said stack of blank sheets 2 is positioned substantially at respective opening 23.

Store 22 comprises an unloading platform 28 for supporting a stack of machined sheets 2; and a lift device 29 controlled by control unit 8 and for vertically lifting unloading platform 28 so that the top of said stack of machined sheets 2 is positioned substantially at respective opening 23.

With reference to FIGS. 3 and 4, each movable closing device 24 comprises two parallel belts 31 located on either side of loading platform 25 or unloading platform 28, and looped about respective numbers of pulleys 32 rotating about respective axes parallel to axis 9. The pulleys 32 of each belt 31 define on belt 31 an upper branch 33 extending parallel to axis 15 at respective opening 23.

Each movable closing device 24 also comprises a shutter 34 between and integral with the two belts 31; and a drive unit (not shown) controlled by control unit 8 and for moving the two belts 31 simultaneously by means of respective pulleys 32. More specifically, said drive unit moves shutter 34 between a closed position in which shutter 34 closes respective opening 23 and defines a portion of worktable 4, and an open position in which shutter 34 is located entirely beneath worktable 4 and to the side of opening 23.

In the example shown, shutter 34, like worktable 4, comprises on top a number of rows of parallel horizontal brushes 10 parallel to those fixed to worktable 4.

With reference to FIG. 4, machine 1 also comprises a handling device 35 controlled by control unit 8, and which is movable over opening 23 of store 21, and comprises a number of suction cups by which to grip a portion of the top sheet 2 in said stack of blank sheets 2, and lift said portion of sheet 2 over worktable 4 when shutter 34 is open.

Finally, machine 1 also comprises a movable stop element 36 (FIGS. 2 and 3) controlled by control unit 8, and which is movable between a rest position beneath worktable 4, and a work position on worktable 4 and at a lateral edge of opening 23 of store 22 to keep sheet 2 at opening 23 in place as shutter 34 is moved from the closed to the open position.

According to a variation not shown, punch unit 5 comprises a known selecting unit for automatically changing the punches, and which is controlled by control unit 8 to select a given punch 12 from those in the selecting unit, and automatically position the selected punch beneath ram 11.

Operation of machine 1 will now be described assuming sheet 2 has been punched by punch unit 5, and feeding and positioning device 7 has placed sheet 2 on worktable 4, at shutter 34 of store 22, which is set to the closed position defining a portion of worktable 4.

Once feeding and positioning device 7 releases the machined sheet 2 on worktable 4, at shutter 34 of store 22, control unit 8 moves stop element 36 into the work position to define a stop for sheet 2.

By means of said drive units, control unit 8 then moves both shutters 34 from the closed to the open position; in the course of which movement, the machined sheet 2 at store 22 is held in place at respective opening 23 by movable stop element 36 (FIG. 2), and slides over the respective moving shutter 34.

As shutters 34 move into the open position, control unit 8 operates lift devices 26 and 29 to lift respective platforms 25 and 28 and position the top of the respective stacks of sheets 2 at respective openings 23 (FIG. 3). Before shutters 34 reach the open position, the machined sheet 2 drops by force of gravity through opening 23 onto the top of the stack of machined sheets 2 (FIG. 3).

As shutters 34 reach the open position, control unit 8 moves movable stop element 36 into the rest position beneath worktable 4, and positions handling device 35 over opening 23 of store 21 to raise a portion of the top sheet 2 in the stack of blank sheets 2 (FIG. 4) by means of said suction cups.

Once the portion of blank sheet 2 is raised over worktable 4 by handling device 35, control unit 8 moves shutters 34 back into the closed position, so that the shutter 34 of store 21 slides beneath the partly raised sheet 2 and lifts it completely onto worktable 4.

Once shutters 34 are closed, feeding and positioning device 7 grips the blank sheet 2 by means of grippers 18, positions the blank sheet 2 at work station 6 where it is punched by punch unit 5, and then transfers the machined sheet 2 onto shutter 34 of store 22, thus completing the machining cycle.

The main advantage of machine 1 as described above is the location of stores 21 and 22 beneath worktable 4, which provides for greatly reducing the size of the machine.

What is claimed is:

1. A machine tool for machining sheet metal, comprising:
   a) a punch unit including a ram at a work station;
   b) a worktable including said workstation, said worktable having a top disposed directly below said ram;
   c) a sheet feeding and positioning device for feeding and positioning a sheet at said work station;
   d) a control unit for controlling said punch unit and said sheet feeding and positioning device;
   e) first and second stores located directly beneath said worktable;
   f) said worktable including first and second openings disposed over respective said first and second stores; and
   g) first and second closures operably associated with respective said first and second openings to permit respective said first and second stores to communicate with said top of said worktable.

2. A machine as in claim 1, wherein:
   a) said first and second closures are movable between a closed position wherein said closures form a portion of said worktable, and an open position wherein corresponding said first and second stores communicate with said top of said worktable.

3. A machine as in claim 1, wherein:
   a) said first store includes a movable loading platform located beneath said first opening; and
   b) said movable platform is configured to position a sheet at said first opening.

4. A machine as in claim 3, and further comprising:
   a) a handling device configured to lift a portion of the sheet located at said first opening.

5. A machine as in claim 4, wherein:
   a) said first closure when moving to said closed position is configured to slide beneath and engage the sheet to lift another portion of the sheet onto said worktable.

6. A machine as in claim 2, wherein:
   a) said second store includes a movable unloading platform located beneath said second opening; and
   b) said movable unloading platform is configured to receive a sheet when said second opening is in said open position.

7. A machine as in claim 6, and further comprising:
   a) a movable stop element configured to retain a sheet at said second opening over said movable unloading platform as said second closure moves from said closed position to said open position.

8. A machine as in claim 1, wherein:
   a) said sheet feeding and positioning device is movable over said worktable within a work area; and
   b) said first and second stores are located beneath said work area.

9. A machine as in claim 1, wherein:
   a) said worktable includes a horizontal axis through said punch unit for dividing said worktable into first and second portions; and
   b) said first and second openings are located on respective said first and second portions.

10. A machine as in claim 9, wherein:
    a) said first and second openings are aligned with each other.

11. A machine as in claim 1, and further comprising:
    a) a punch located between said worktable and said ram at said work station; and b) a counterpunch located on said worktable at said work station and aligned with said punch.

12. A machine as in claim 1, wherein:
a) each of said first and second closures include a pair of belts; and
b) each of said closures includes shutters disposed between said pair of belts.

13. A machine as in claim 12, wherein:
a) each of said closures includes a plurality of brushes disposed on said shutters.

14. A machine as in claim 1, wherein:
a) said worktable includes rows of brushes disposed on said top.

15. A machine tool for machining sheet metal, comprising:
a) a punch unit including a ram;
b) a worktable including a top disposed directly below said ram;
c) first and second stores located directly beneath said worktable and said top;
d) said worktable including first and second openings disposed over respective said first and second stores; and
e) first and second movable closures operably associated with respective said first and second openings to permit respective said first and second stores to communicate with said top of said worktable.

16. A machine as in claim 15, wherein:
a) said worktable includes a workstation; and
b) a sheet feeding and positioning device for feeding and positioning a sheet at said work station.

17. A machine as in claim 16, wherein:
a) said sheet feeding and positioning device is configured to move the sheet over said worktable along two mutually perpendicular horizontal axes.

18. A machine as in claim 17, and further comprising:
a) a control unit for controlling said punch unit and said sheet feeding and positioning device.

19. A machine tool for machining sheet metal, comprising:
a) a worktable having a top;
b) a punch unit located on said worktable at a work station;
c) said worktable including a sheet feeding and positioning device for feeding and positioning a sheet at said work station, said sheet feeding and positioning device being configured to move the sheet over said worktable along two mutually perpendicular horizontal axes;
d) a control unit for controlling said punch unit and said sheet feeding and positioning device;
e) first and second stores located directly beneath said worktable;
f) said worktable including first and second openings disposed over respective said first and second stores; and
g) first and second closures operably associated with respective said first and second openings, said closures being movable between open and closed positions and configured to permit respective said first and second stores to communicate with said top of said worktable when in said open position.

20. A machine tool for machining sheet metal, comprising:
a) a worktable having a top;
b) a punch unit located on said worktable at a work station;
c) first and second stores located beneath said worktable;
d) said worktable including first and second openings disposed over respective said first and second stores;
e) first and second closures operably associated with respective said first and second openings to permit respective said first and second stores to communicate with said top of said worktable;
f) said first and second closures are movable between a closed position wherein said first and second closures form a portion of said worktable, and an open position wherein the corresponding said first and second stores communicate with said top of said worktable;
g) a movable loading platform located within said first store and disposed beneath said first opening, said movable platform being configured to position a sheet at said first opening;
h) a handling device configured to lift a portion of the sheet located at said first opening; and
i) said first closure when moving to said closed position is configured to slide beneath and engage the sheet to lift another portion of the sheet onto said worktable.

21. A machine tool for machining sheet metal, comprising:
a) a worktable having a top;
b) a punch unit located on said worktable at a work station;
c) a sheet feeding and positioning device for feeding and positioning a sheet at said work station;
d) a control unit for controlling said punch unit and said sheet feeding and positioning device;
e) first and second stores located beneath said worktable;
f) said worktable including first and second openings disposed over respective said first and second stores; and
g) first and second closing means operably associated with respective said first and second openings for permitting respective said first and second stores to communicate with said top of said worktable.

* * * * *